US 8,483,010 B2

United States Patent
Virgin et al.

(12) United States Patent
Virgin et al.

(10) Patent No.: US 8,483,010 B2
(45) Date of Patent: Jul. 9, 2013

(54) PROVIDING COMMUNICATIONS REDUNDANCY USING ONE OR MORE LOOP CONNECTIONS IN A SUBTERRANEAN SURVEY SYSTEM

(75) Inventors: Brian Lee Virgin, Rykkinn (NO); Jostein Fonneland, Oslo (NO); Stuart Papworth, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 396 days.

(21) Appl. No.: 12/694,923

(22) Filed: Jan. 27, 2010

(65) Prior Publication Data
US 2011/0182145 A1    Jul. 28, 2011

(51) Int. Cl.
*G01V 1/22*    (2006.01)
*G01V 1/20*    (2006.01)

(52) U.S. Cl.
USPC ............................................. 367/76; 367/58

(58) Field of Classification Search
USPC .......................................................... 367/76
See application file for complete search history.

(56) References Cited

U.S. PATENT DOCUMENTS

| 5,627,798 | A  * | 5/1997  | Siems et al. ................... 367/76 |
| 6,672,422 | B2 * | 1/2004  | Orban et al. .................. 181/108 |
| 7,012,853 | B2 * | 3/2006  | Iseli et al. ....................... 367/78 |
| 7,263,030 | B2 * | 8/2007  | Chamberlain ................. 367/76 |
| 7,292,943 | B2   | 11/2007 | Elder et al. |
| 7,898,904 | B2 * | 3/2011  | Arnegaard et al. ............. 367/76 |
| 8,199,611 | B2 * | 6/2012  | Goujon .......................... 367/178 |
| 2004/0105341 | A1 | 6/2004 | Chamberlain et al. |
| 2009/0243616 | A1 | 10/2009 | Loehken et al. |
| 2010/0128564 | A1 * | 5/2010 | Boucard ......................... 367/76 |

OTHER PUBLICATIONS

International Search Report of PCT Application Serial No. PCT/US2011/022330 dated Aug. 30, 2011: pp. 1-3.
Anonymous, "408UL Seismic Acquisition System," Sercel, Aug. 2006: pp. 1-9, <www.sercel.com>.

* cited by examiner

*Primary Examiner* — Ian Lobo

(57) ABSTRACT

A subterranean survey system includes a sensor string having a communications link and a plurality of survey sensors connected to the communications link. The sensor string has a loop connection to provide communications redundancy, and the survey sensors are used to detect signals affected by a subterranean structure. A first router is connected to the sensor string, and a transport network is connected to the first router. The first router communicates data from the survey sensors over the transport network.

17 Claims, 5 Drawing Sheets

PROVIDING COMMUNICATIONS REDUNDANCY USING ONE OR MORE LOOP CONNECTIONS IN A SUBTERRANEAN SURVEY SYSTEM

TECHNICAL FIELD

The invention relates generally to providing communications redundancy using one or more loop connections in a subterranean survey system.

BACKGROUND

Seismic or electromagnetic (EM) surveying can be performed for identifying and characterizing subterranean elements, such as hydrocarbon reservoirs, fresh water aquifers, gas injection reservoirs, and so forth. With seismic surveying, one or more seismic sources are placed in various locations above a land surface or sea floor, with the seismic sources activated to generate seismic waves directed into the subterranean structure.

The seismic waves generated by a seismic source travel into the subterranean structure, with a portion of the seismic waves reflected back to the surface for receipt by seismic sensors (e.g. geophones, hydrophones, accelerometers, etc.). These seismic sensors produce signals that represent detected seismic waves. Signals from the seismic sensors are processed to yield information about the content and characteristic of the subterranean structure.

EM surveying involves deployment of one or more EM sources that produce EM waves that are propagated into the subterranean structure. EM signals are affected by elements in the subterranean structure, and the affected EM signals are detected by EM sensors, which are then processed to yield information about the content and characteristic of the subterranean structure.

In a subterranean survey system, data acquired by survey sensors is transported to a central recording station (e.g., recording truck) via a communications network. Typically, this communications network includes various routers connected to corresponding networks to transport data of survey sensors.

An issue associated with a subterranean survey system is that damage to one or more components in the subterranean survey system can cause some part of the subterranean survey system to fail. For example, a cable may break, a router may go down, and so forth. Failure in communications of any part of the subterranean survey system would mean that data from survey sensors in the failed part would not be received by the central recording station, and therefore, cannot be analyzed. This can lead to inaccurate analysis of the data acquired by the subterranean survey system, which can lead to inaccurate conclusions reached regarding the content of a subterranean structure.

SUMMARY

In general, according to an embodiment, redundancy is provided for communications in a subterranean survey system. The redundancy is provided by providing a loop connection in a sensor string and/or providing a loop connection in a router network.

Other or alternative features will become apparent from the following description, from the drawings, and from the claims.

DETAILED DESCRIPTION

Figure 1:
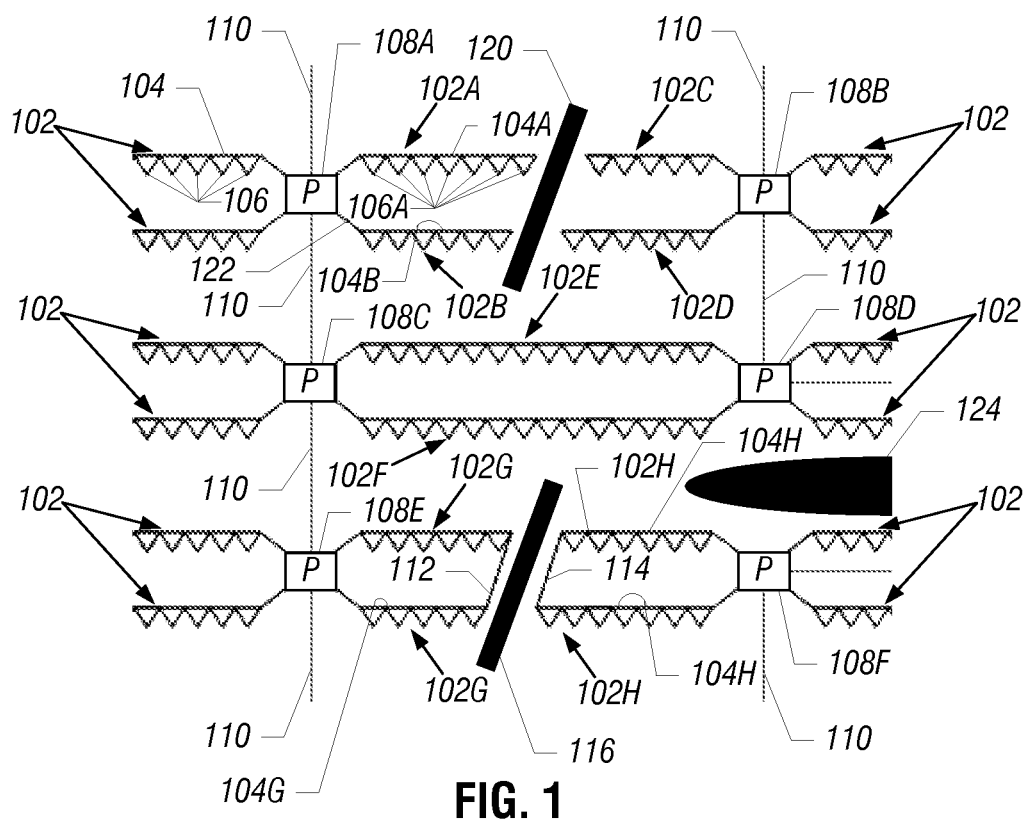
FIG. 1 is a schematic diagram of a portion of a subterranean survey system that has sensor strings, where some of the sensor strings have loop connections in accordance with an embodiment.

In the following description, numerous details are set forth to provide an understanding of the present invention. However, it will be understood by those skilled in the art that the present invention may be practiced without these details and that numerous variations or modifications from the described embodiments are possible.

In general, redundancy is provided in a subterranean survey system (also referred to as a survey data acquisition system) by including one or more loop connections at one or more levels of networks. In one exemplary embodiment, the multiple levels of networks include the following: (1) a first level that includes a communications link provided in a sensor string that has multiple survey sensors connected to the communications link; (2) a second level that includes a transport network connected to transport routers; and (3) a third level that includes a backbone network connected to backbone routers.

A "loop connection" (or more simply "loop") refers to a data path in a network that starts at a first node and traverses through other nodes, and then returns to the first node. The nodes in the loop connection can be of the same type, or of different types. For example, a loop connection provided in a sensor string can include a transport router and multiple survey sensors. Another loop connection can include a backbone router and multiple transport routers. A third type of loop connection can include multiple backbone routers, or alternatively, multiple backbone routers and a recording station.

The communications redundancy provided by loop connections at one or more levels in the subterranean survey system allows for the subterranean survey system to continue to be able to communicate survey data from survey sensors to a central recording station even if one part of the subterranean survey system should fail. Examples of failure include cables breaking, routers going down, and so forth.

A "survey sensor" refers to a module that has one or more sensing elements for sensing signals that are affected by a subterranean structure in response to a source signal from a survey source. The survey source can be an electromagnetic (EM) transmitter or a seismic source. The sensing element of the survey sensor can be an EM sensing element or a seismic sensing element. A "router" refers to a communications module that routes data between nodes of a subterranean survey system. In accordance with some embodiments, there are two types of routers: a transport router that is connected to communicate data over a transport network, and a backbone router that is provided to communicate data over a backbone network. In other embodiments, additional types of routers can be provided, and additional types of networks can be provided.

A transport network is a network that is connected to sensor strings to receive data from survey sensors in the corresponding sensor strings. The transport router communicates data received from the survey sensors over a transport network to either another transport router or to a backbone router. A backbone router is connected to transport networks and to a backbone network, with the backbone router routing data between the transport and backbone networks.

An example of a central recording station is a recording truck. The recording station receives measurement data from survey sensors through various routers and networks. The recording station includes a storage subsystem to store the received measurement data.

FIG. 1 illustrates a portion of a subterranean survey system according to an embodiment. Multiple sensor strings 102 are provided, where each sensor string 102 includes a communications link 104 and multiple survey sensors 106 (represented as triangles in FIG. 1) connected to the communications link 104 (in FIG. 1, some specific survey strings are represented as 102A-102J, and survey string 102A is depicted as including a communications link 104A and survey sensors 106A). Each sensor string is connected to a transport router 108 (108A, 108B, 108C, 108D, 108E, and 108F depicted in FIG. 1). Each transport router 108 is also labeled "P" in FIG. 1. The transport routers 108 are connected to a transport network 110. Note that the transport network 110 can include multiple segments connected between corresponding pairs of transport routers 108.

In the embodiment of FIG. 1, the sensor string 102G in combination with a link segment 112 (e.g., cable segment) and the transport router 108E form a loop connection. Similarly, the sensor string 102H in combination with a link segment 114 and the transport router 108F form another loop connection.

As depicted in FIG. 1, an obstacle 116 is present between the sensor string 102G and the sensor string 102H. Examples of the obstacle 116 include natural obstacles (e.g., canyons, large rocks, etc.) or man-made obstacles (e.g., large equipment or vehicles, etc.). The loop connections in sensor strings formed on the two sides of the obstacle 116 allow for improved redundancy to survey sensors in the respective sensor strings 102G and 102H to continue to transmit data to the network 110 even if some part of the sensor string 102G or 102H were to fail.

Even if one point in the communications link 104G or 104H should break, the survey sensors would still be able to communicate with the corresponding transport router through an alternative path in the respective loop. For example, if a point 118 in the communications link 104G were to break, all the survey sensors in the sensor string 102G can still continue to communicate data to the transport router 108E through the other part of the loop provided by the communications link 104G.

On the other hand, the sensor strings 102A, 102B, 102C, and 102D are not provided with loop connections, and thus, these sensor strings do not provide redundancy in case of failure at points in such sensor strings. A first pair of the sensor strings (102A, 102B) is separated from a second pair of the sensor strings (102C, 102D) by an obstacle 120. In the example of FIG. 1, if a point 122 in the communications link 104B were to fail, then none of the sensors in the sensor string 102B would be able to communicate data to the transport router 108A, which means that the subterranean survey system would not be able to receive and analyze survey data acquired by the survey sensors in the sensor string 102B.

In FIG. 1, note also that each of sensor strings 102E and 102F are connected at both ends to corresponding transport routers 108C and 108D. This also provides redundancy since each survey sensor in the sensor string 102E or 102F has alternate paths such that data communication can still proceed even if one point of the communications link in the sensor string 102E or 102F should break.

FIG. 1 also shows another obstacle 124 that is provided between transport routers 108D and 108F, such that there is a break in the transport network 110 between the transport routers 108D and 108F.

Figure 2:
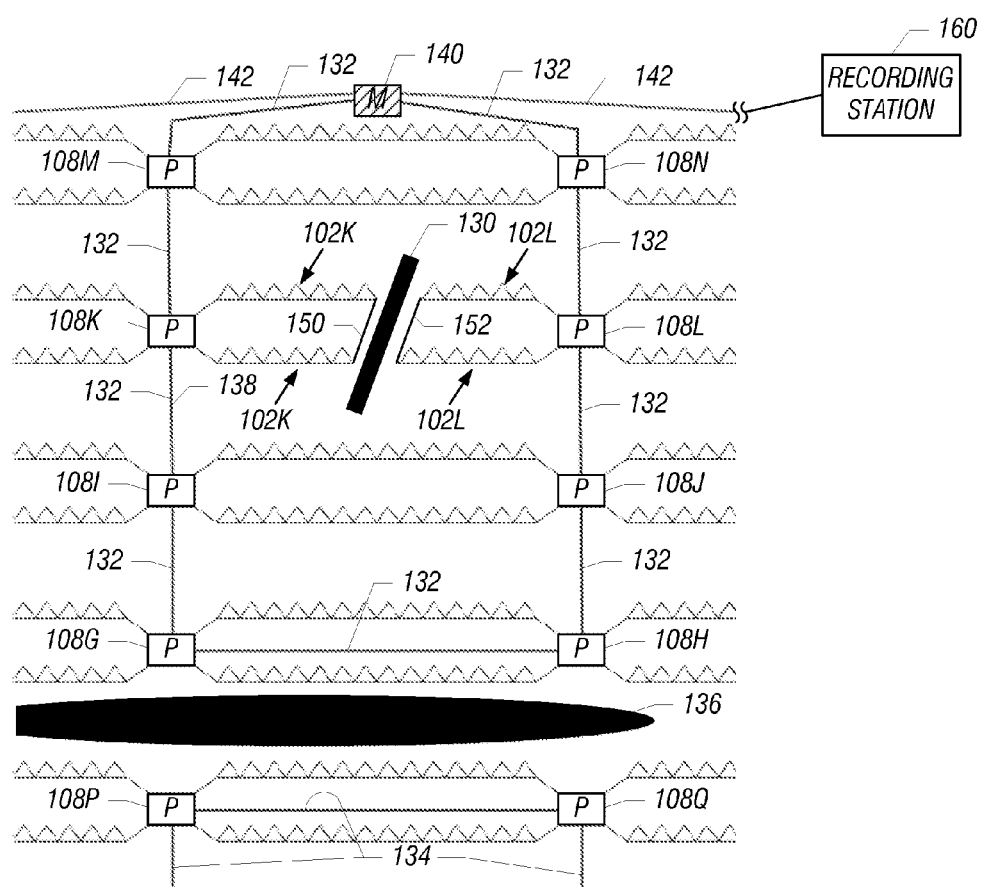
FIG. 2 is a schematic diagram of a portion of a subterranean survey system according to another embodiment in which a loop connection is provided in a transport network that is connected to multiple transport routers.

FIG. 2 shows a portion of a subterranean survey system according to another embodiment. In the FIG. 2 example, sensor strings 102K and 102L are separated by an obstacle 130. Each of the sensor string 102K and sensor string 102L includes a loop connection similar to the loop connection found in the sensor string 102G or 102H in FIG. 1. The loop connection for the sensor string 102G includes the communications link of the sensor string 102K, a link segment 150, and the transport router 108K. Similarly, the loop connection for the sensor string 102L includes the communications link of the sensor string 102L, a link segment 152, and the transport router 108L.

In addition to a loop connection provided at the sensor string level, FIG. 2 also shows a loop connection provided at the transport network level. A transport network 132 is connected in a loop by transport routers 108G, 108H, 1081, 108J, 108K, 108L, 108M, and 108N, and by a backbone router 140. With the loop connection in the transport network 132, a break at any point in the transport network (such as a break at point 138), would not render some of the transport routers inaccessible, since the transport routers can communicate data over an alternate path in the loop provided in the transport network 132.

The backbone router 140 (labeled as "M" in FIG. 2) is connected to a backbone network 142, which is ultimately connected to a recording station 160. FIG. 2 also shows an obstacle 136, and additional transport routers 108P and 108Q connected to another transport network 134.

Figure 3:
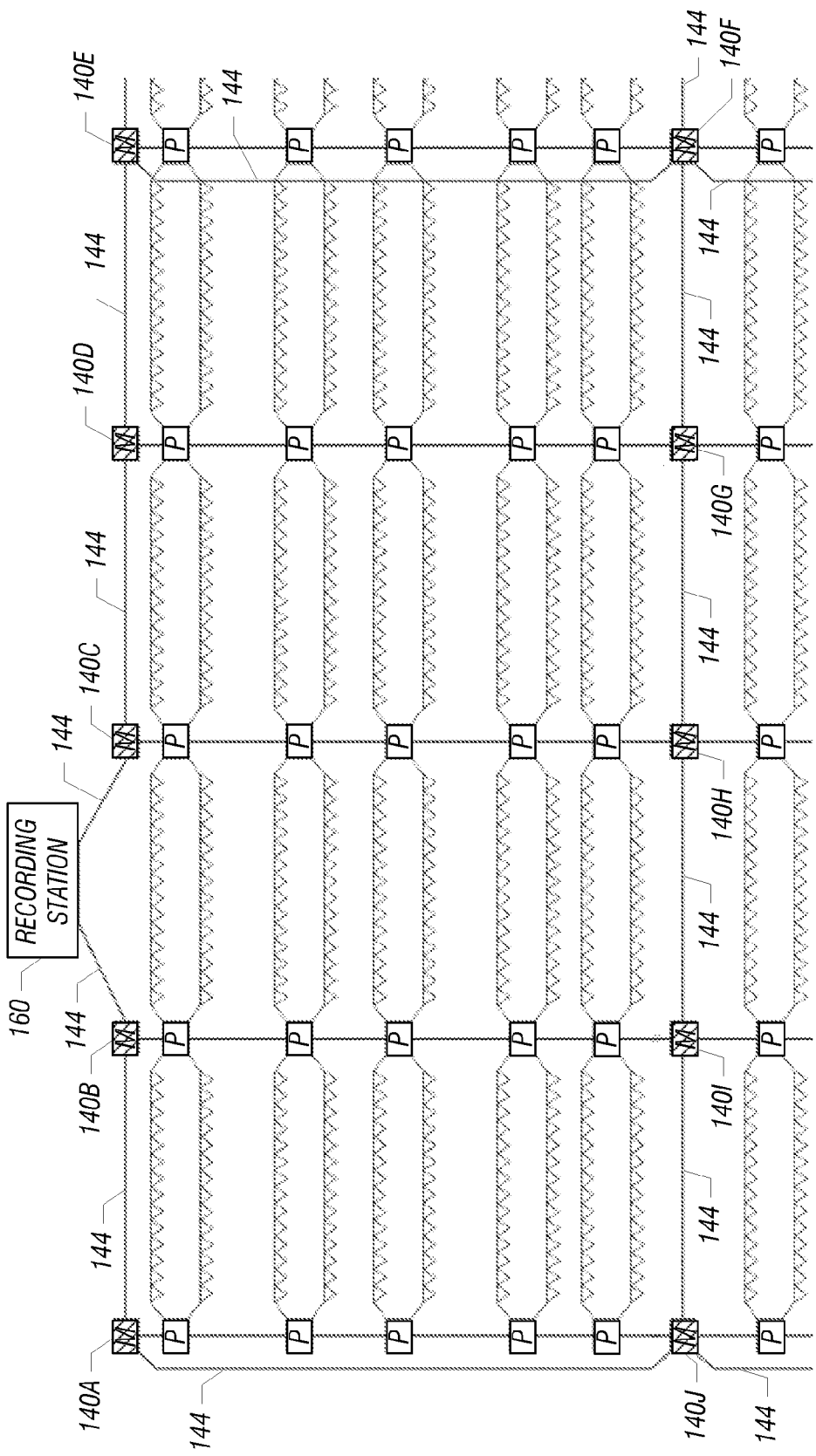
FIG. 3 is schematic diagram of a portion of a subterranean survey system according to a further embodiment that includes transport routers and backbone routers, where the backbone routers are connected to a backbone network, and where the backbone routers are arranged to provide a loop connection in the backbone network.

FIG. 3 shows a loop connection provided in a backbone network 144, where the backbone network 144 includes network segments between corresponding backbone routers 140A, 140B, 140C, 140E, 140F, 140G, 140H, 1401, and 140J (each labeled "M"), and by network segments between backbone routers 140B, 140C and the recording station 160. Although not depicted in FIG. 3, note that loop connections can also be provided in one or more transport networks connected by transport routers (labeled "P"). Also, loop connections can be provided in corresponding sensor strings. In FIG. 3, the backbone network 144 is represented as a thicker line than the transport networks connected by transport routers.

Figure 4:
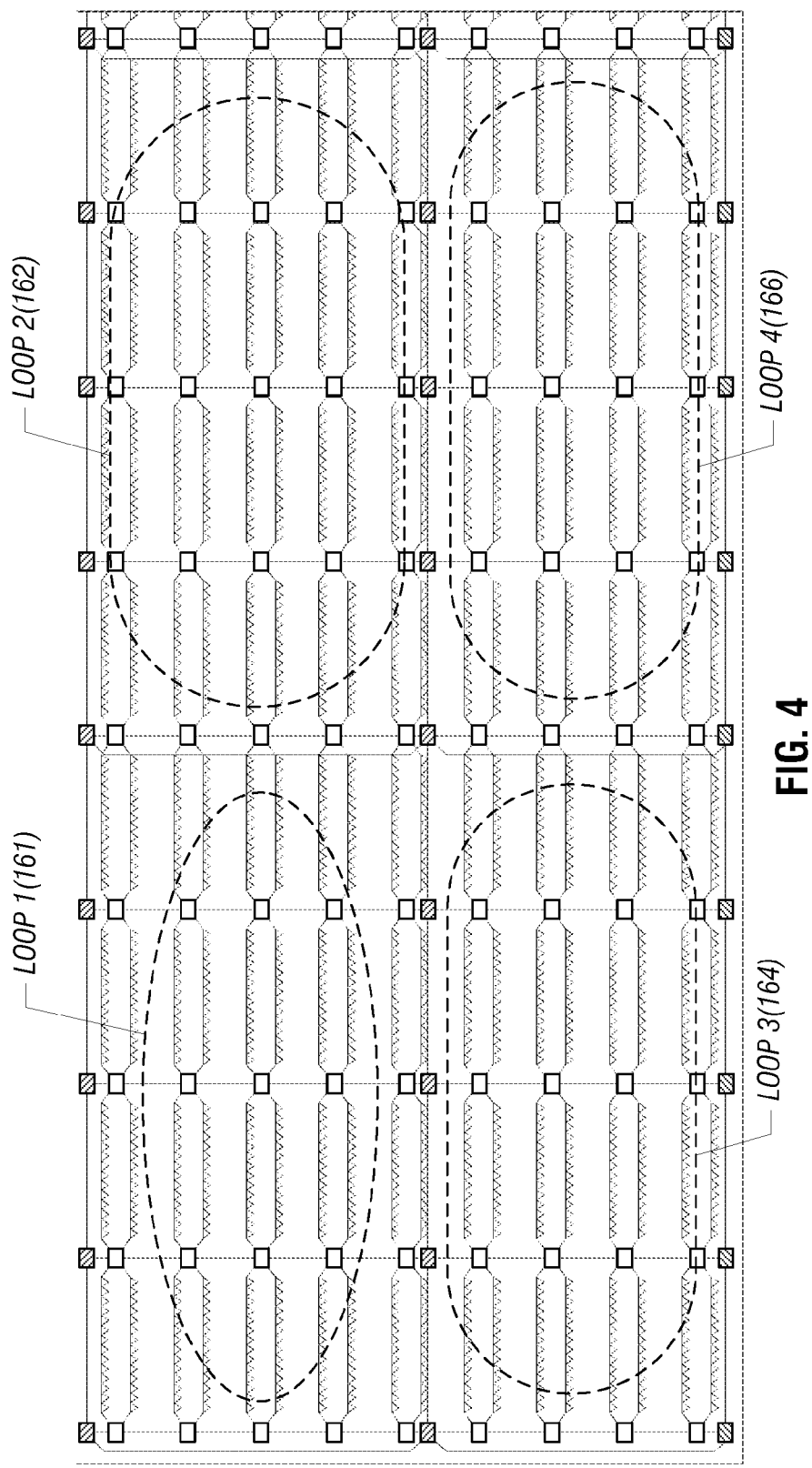
FIG. 4 is a schematic diagram of a subterranean survey system according to yet a further embodiment in which multiple backbone networks are arranged in multiple loops.

FIG. 4 shows four backbone loops 161, 162, 164, and 166 made up of respective backbone networks (represented as thicker lines in FIG. 4). The multiple backbone loops 161, 162, 164, and 166 provide a backbone grid (of networks), rather than separate backbone networks. The backbone grid gives multiple numbers of possible data paths to a recording station to increase redundancy.

Figure 5:
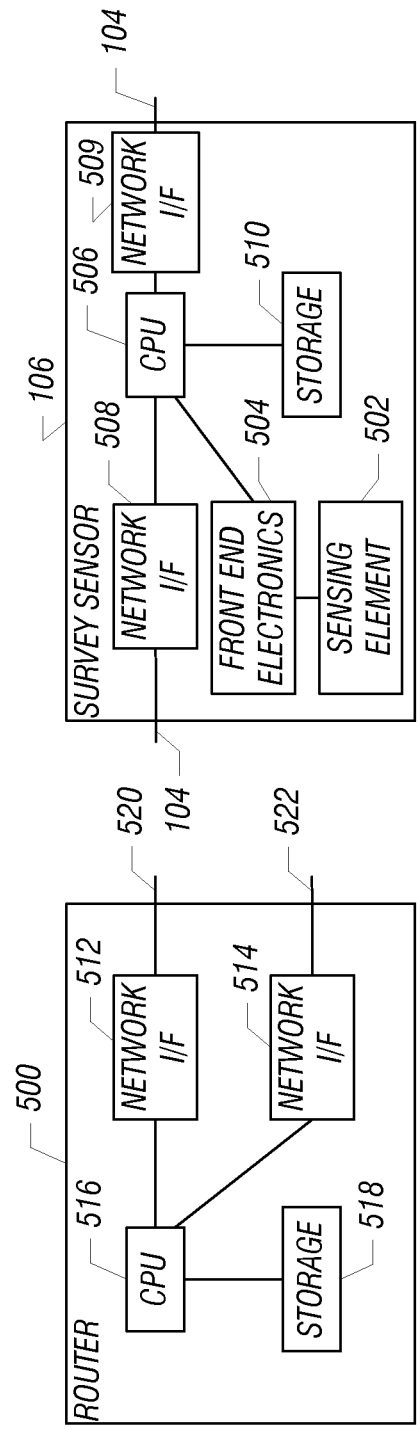
FIG. 5 illustrates components in an exemplary survey sensor and an exemplary router, according to an embodiment.

FIG. 5 is a block diagram of components of a survey sensor 106 and a router 500, where the router 500 can be either a transport router 108 or a backbone router 140. The survey sensor 106 includes one or more sensing elements 502 (e.g., EM sensing elements or seismic sensing elements) that are electrically connected to front-end electronic circuitry 504 (which can include an analog-to-digital converter, signal amplifier, and/or other electronic circuitry).

The measurement data from the front-end electronic circuitry 504 is provided to a central processing unit (CPU) 506. The CPU 506 can be connected to network interfaces 508 and 509 to allow data acquired by the sensing element 502 to be communicated over communications links 104. The survey sensor also includes storage 510 (memory, disk storage, etc.) that can be used to temporarily store measurement data acquired by the sensing element 502, where the measurement data is to be communicated by the network interface 508 over the communications link 104.

The router 500 includes multiple network interfaces 512, 514 to allow the router 500 to be communicated to different network segments. Although just two network interfaces are shown in FIG. 5, it is noted that more than two network interfaces can be provided. For example, if the router 500 is a transport router, then the network interfaces 512 and 514 can be connected as follows: (1) network interface(s) 512 connected to a sensor string communications link 104 and network interface(s) 514 connected to a transport network segment; or (2) network interfaces 512 and 514 connected to corresponding transport network segments. The router includes a CPU 516 on which software is executable to perform routing tasks. The CPU 516 is connected to a storage 518.

If the router 500 is a backbone router, then the network interfaces 512 and 514 can be connected as follows: (1) network interface(s) 512 connected to a transport network segment, and network interface(s) 514 connected to a backbone network segment; or (2) network interfaces 512 and 514 connected to corresponding backbone network segments.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A subterranean survey system, comprising:
   a sensor string having a communications link and a plurality of survey sensors connected to the communications link, wherein the sensor string has a loop connection to provide communications redundancy, and wherein the survey sensors are used to detect signals affected by a subterranean structure;
   a plurality of transport routers, wherein a first of the transport routers is connected to the sensor string;
   a transport network connected to the transport routers, wherein the first transport router is to communicate data from the survey sensors over the transport network;
   a plurality of backbone routers; and
   a backbone network connected to the backbone routers, wherein at least one of the backbone routers and multiple ones of the transport routers are arranged to provide a transport network loop connection.

2. The subterranean survey system of claim 1, further comprising additional sensor strings connected to corresponding transport routers, wherein each of the additional sensor strings includes a communications link and survey sensors connected to the communications link.

3. The subterranean survey system of claim 1, wherein a particular one of the backbone routers is connected to at least two of the transport routers, wherein the particular backbone router and the at least two transport routers are arranged to provide the transport network loop connection.

4. The subterranean survey system of claim 3, wherein the particular backbone router is to receive data of survey sensors from the at least two transport routers.

5. The subterranean survey system of claim 1, further comprising a recording station connected to the backbone network to receive the data of the survey sensors from the backbone routers and to record the data of the survey sensors.

6. The subterranean survey system of claim 4, wherein the backbone routers are arranged to provide a backbone network loop connection.

7. The subterranean survey system of claim 6, further comprising a second backbone network and further backbone routers connected to the second backbone network, wherein the further backbone routers are arranged to provide another backbone network loop connection in the second backbone network.

8. The subterranean survey system of claim 7, wherein the backbone network loop connections form a backbone network grid.

9. The subterranean survey system of claim 6, further comprising a recording station connected to at least two of the backbone routers, wherein the recording station and the backbone routers form the backbone network loop connection.

10. The subterranean survey system of claim 1, wherein the survey sensors are seismic sensors.

11. The subterranean survey system of claim 1, wherein the survey sensors are electromagnetic sensors.

12. The subterranean survey system of claim 1, wherein the loop connection of the sensor string is formed by the first transport router, a link segment, and portions of the communications link connected by the first transport router and link segment.

13. The subterranean survey system of claim 1, further comprising:
   a second sensor string having a second communications link and survey sensors connected to the second communications link, wherein the second sensor string is connected between a pair of the transport routers.

14. A method of arranging a subterranean survey system, comprising:
   providing a sensor string having a communications link and survey sensors connected to the communications link, wherein the survey sensors are to transmit measurement data representing a subterranean structure;
   providing transport routers connected to a transport network, wherein a first of the transport routers is connected to the sensor string, wherein a loop connection is provided in the sensor string, the loop connection starting at a first of the survey sensors and looping back through the sensor string to the first survey sensor; and
   providing backbone routers connected to a backbone network, wherein at least one of the backbone routers and multiple ones of the transport routers are arranged to provide a transport network loop connection.

15. The method of claim 14, wherein the transport network loop connection starts at a particular one of the transport routers and loops back through the transport network to the particular transport router.

16. The method of claim 14, wherein the backbone routers form a backbone network loop connection that starts at a particular one of the backbone routers and loops back through the backbone network to the particular backbone router.

17. The method of claim 16, further comprising:
   providing additional backbone network loop connections formed of other backbone routers and backbone networks, wherein the backbone network loop connections form a backbone network grid.

* * * * *